Patented June 5, 1945

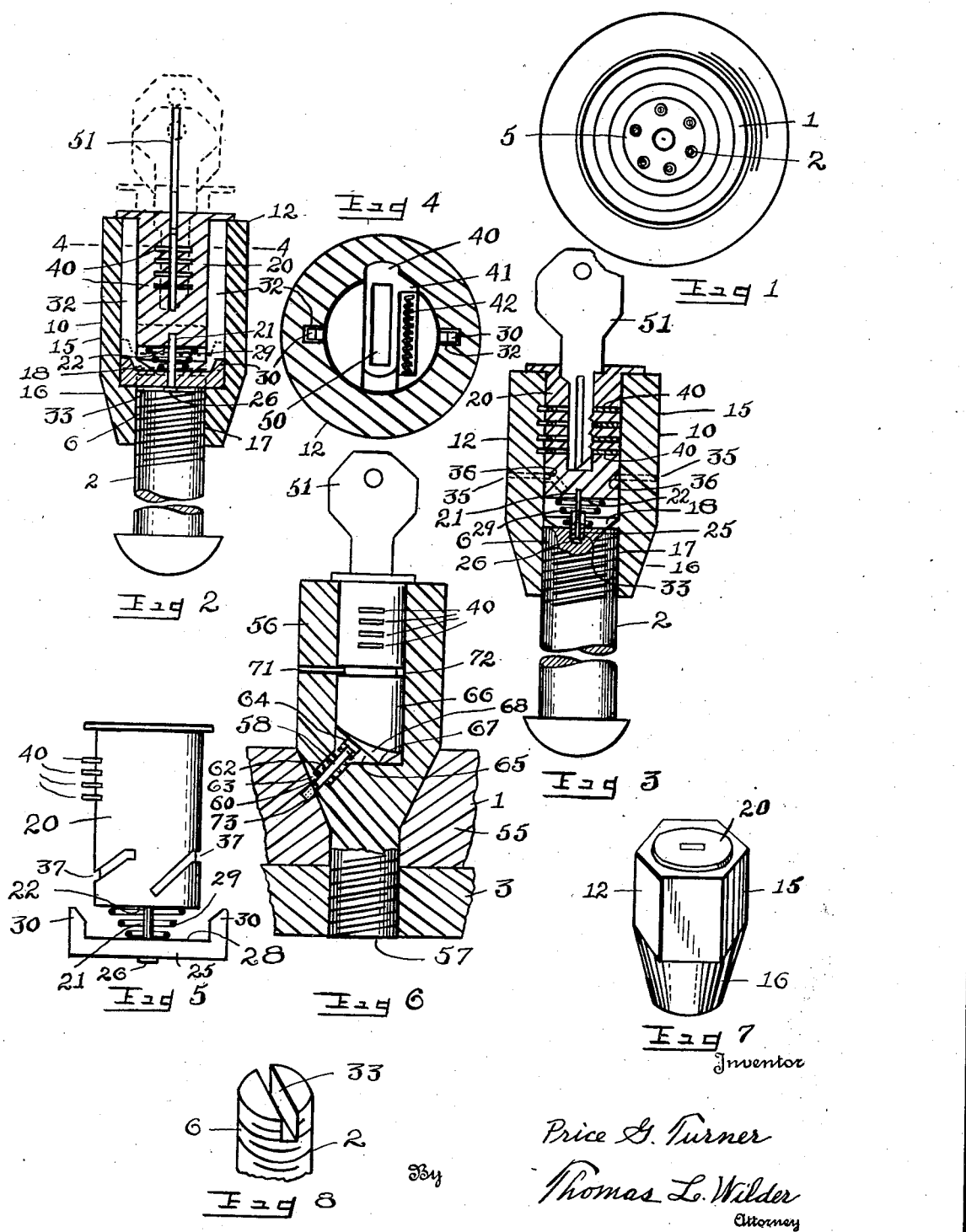

2,377,465

UNITED STATES PATENT OFFICE 2,377,465

WHEEL LOCK

Price G. Turner, Yorkville, N. Y.

Application February 27, 1942, Serial No. 432,666

1 Claim. (Cl. 70—230)

My invention relates to a wheel lock and I declare the following to be a full, clear, concise and exact description thereof sufficient to enable anyone skilled in the art to which it appertains to make and use the same, reference being had to the accompanying drawing in which like reference characters refer to like parts throughout the specification.

The object of the invention is to provide a lock more particularly for automobile wheels, whereby to prevent the removal of the wheels for the purpose of purloining the tires thereon.

Heretofore it has been possible for an unauthorized person to remove the wheels of an automobile when left parking for any space of time for the purpose of securing the tires on the wheels.

By the present device the wheels will be securely held in place by a locking bolt or locking nut whichever is desirable. The nut or bolt cannot be released without a key carried by the authorized owner.

The object will be understood by referring to the drawing in which:

Fig. 1 is a side elevation of an automobile wheel.

Fig. 2 is a central vertical section of the locking device.

Fig. 3 is a central vertical section at right angles to Fig. 2.

Fig. 4 is a detailed enlarged view taken on the line 4—4 of Fig. 2.

Fig. 5 is a detailed enlarged view of the cylinder lock and the immediate parts employed.

Fig. 6 is a central vertical section of a modified form of the lock.

Fig. 7 is a detailed view reduced in scale showing a perspective of a lock nut employed.

Fig. 8 is a detailed perspective view showing bolt employed, parts being broken away.

Referring more particularly to the drawings, an automobile wheel is represented at 1. In this instance, headed bolts 2 projecting from the inner side of the hub 3 outward are used to hold wheel 1 to the hub 3. Wheel 1 is mounted to hub 3 by pushing the central part 5 having cooperating apertures onto the projecting threaded ends 6 of said bolts 2 and then applying the lock nuts 10.

Each of said lock nuts 10 comprises a hollow casting or member 12 having an upper hexagonal outer surface 15 for application of a socket wrench not shown and a lower conical surface 16. The interior part of member 12 is cylindrical in cross section. The lower interior part 17 is threaded for the application of a bolt aforementioned. A shoulder 18 is formed integral with part 17 of nut 10 and projects into the path of the upper end of bolt 2 when assembled therein, whereby to limit the extent of insertion of bolt 2 with the threaded part of nut 10.

Cylindrical lock 20 is fitted to the upper hollow interior portion of member 12. A headed bolt 21 is embedded in and projects downwardly from the central lower surface 22 of cylinder 20. A vertically movable yoke 25 is mounted to slide on bolt 21 between head 26 and the lower surface of cylinder 20. A conical spring 29 is mounted on bolt 21 between the upper surface 28 of yoke 25 and the lower surface 22 of cylinder 20, whereby to press said yoke 25 normally downward against head 26 of bolt 21. A conical spring 29 is used in this instance to allow it to be compressed into one plane.

The free ends of yoke 25 have upward projecting parts 30, 30 that are fitted to slide in grooves 32, 32 made at diametrically opposite locations in the interior portion of member 12.

When yoke 25 is pressed downward by conical spring 29 against head 26 of bolt 21 the cross part thereof will engage the corresponding cross groove 33 countersunk in the upper end of bolt 2 when brought into alignment as hereinafter described, whereby to lock said bolt 2 in predetermined position.

The means for releasing said yoke 25 from locked relation with the upper end of bolt 2 embodies studs 35, 35 embedded in casting 12 at diametrically opposite locations and projecting outwardly into the interior thereof. The projecting portions 36, 36 of studs 35, 35 extend into spiral grooves 37, 37 formed in the exterior surface of cylinder 20 at diametrically opposite locations thereof, whereby the rotation of cylinder 20 in one direction will elevate yoke 25 out of countersunk groove 33 made in the upper end of bolt 2 and the rotation of cylinder 20 in the opposite direction will lower yoke 25 into groove 33 of bolt 2.

The means for locking cylinder 20 in its lowermost position within the interior of casting 12, with yoke 25 in engagement with groove 33 of bolt 2 contemplates spring pressed tumblers 40 that slide in horizontally disposed grooves made in cylinder 20. To this end each of the tumblers 40 has a projection 41. A coiled spring 42 housed in a suitable recess in cylinder 20 presses at one end against the lower surface of projection 41 of tumbler 40 and at the other against the surface of cylinder 20, whereby to hold said tumblers 40 in outward projecting position illustrated in Fig. 4.

A slot 50 is formed in the central part of each of the tumblers 40 for the projection of key 51. When key 51 is inserted in cylinder 20 through the slots 50 of the several tumblers 40, said tumblers 40 will be drawn inward against the tension of their respective coil springs 42, whereby to allow said cylinder 20 to rotate in its recess in casting 12 to draw yoke 25 either upward or downward in accordance with the direction of rotation of said cylinder 20. When key 51 is withdrawn from cylinder 20 said tumblers 40 will be projected outwardly into corresponding aligned recesses in casting 12 into locking position illustrated in Fig. 4.

In operation, the wheel 1 of the automobile will be placed in position against the hub 3 with bolts 2 projecting through the apertures in hub 3 and wheel 1 and their threaded ends extending therefrom. Lock nuts 10 will be applied then to the free protruding screw threaded ends of bolts 2 and turned thereon until they come in contact with the adjacent outer surface of wheel 1, whereupon the key 51 will be inserted in each of the several cylinder locks 20 to draw in tumblers 40 and thereby permit each of the cylinders 20 to be rotated to the right. The rotation of each of the cylinders 20 will cause studs 35, 35 projecting into grooves 37, 37 respectively in each of said cylinders 20 to move said cylinders 20 and the connecting yokes 25 downward.

As cylinder 20 approaches its lowermost position, yoke 25 will come in contact with the upper surface of bolt 2 and cause conical spring 29 to be compressed. Key 51 will then be withdrawn from cylinder 20 whereupon tumblers 40 will be spring pressed outwardly to engage their respective recesses in casting 12. This will prevent the further turning of cylinder 20 relative to casting 12.

Any further rotation in either direction of lock nut 10 after key 51 is withdrawn from cylinder 20 will align yoke 25 with groove 33 of bolt 2, whereupon conical spring 29 will force said yoke 25 into groove 33 of bolt 2 to lock nut 10 against further turning in either direction on bolt 2.

In those cases where bolts 57 are assembled by projecting from the outside through the hub 55 of the wheel 1 into the threaded apertures in the hub 3 on the axle, the bolts 57 are each equipped with a head 56 that is made integral with the bolt 57 corresponding to bolt 2 of the former construction.

In order to lock bolt 57 in assembled position after it is screwed home through the wheel 1 into hub 55, there is provided a spring pressed lug or pin 58 that slides in an aperture 60 formed in head 56. A coiled spring 62 presses at one end against the shoulder 63 of aperture 60 and at the other end against the head 64 of lug or pin 58.

Head 64 of lug 58 rests against the lower cam surface 65 of cylinder lock 66 formed by cutting the lower surface of cylinder 66 at an angle 67 and beveling the same at 68 as shown in Fig. 6.

The means for holding lock 66 in assembled position within head 56 embodies a pin 71 tightly fitted to a suitable aperture in head 56. Pin 71 projects into an annular groove 72 made in the peripheral surface of cylinder lock 66, whereby to allow cylinder 66 to turn within head 56.

In order to lock bolt 57 in place, whereby wheel 1 cannot be removed, key 51 is inserted, whereby to withdraw tumblers 40 into cylinder 20 and then said cylinder 20 is rotated by means of key 51 to push lug 58 outward into dotted line position into an aligned aperture 73 in wheel 1 and thereupon removing key 51, whereupon tumblers 40 will be spring pressed into corresponding aligned apertures in head 56. Bolt 57 can be unlocked by again inserting key 51 into cylinder 20 and rotating said cylinder in the opposite direction whereupon, lug 58 will be automatically withdrawn from aperture 73 by means of spring 62 into full line position illustrated in Fig. 6.

Having thus described my invention what I claim as new and desire to secure by Letters Patent is as follows:

In a wheel lock, a stud bolt adapted to engage the hub of a wheel, a lock cylinder mounted in a recess in the head of the bolt, a spring retracted pin also mounted in the head of the bolt and adapted to be projected into a recess formed in the hub of a wheel, whereby the bolt is locked against rotation, and a cam surface on the lock cylinder for moving the pin into the recess upon rotation of the said cylinder.

PRICE G. TURNER.